Dec. 13, 1927.  
A. APEL  
1,652,806  
HARVESTING MACHINE  
Filed Oct. 20, 1925  4 Sheets-Sheet 1

INVENTOR:  
ALBERT APEL  
BY Charles S. Evans  
HIS ATTORNEY.

Dec. 13, 1927.

A. APEL 1,652,806

HARVESTING MACHINE

Filed Oct. 20, 1925     4 Sheets-Sheet 2

INVENTOR
ALBERT APEL
BY Charles S. Evans
HIS ATTORNEY

Dec. 13, 1927.

A. APEL 1,652,806

HARVESTING MACHINE

Filed Oct. 20, 1925

INVENTOR.
ALBERT APEL
BY Charles S. Evans
HIS ATTORNEY

Dec. 13, 1927.
A. APEL
1,652,806
HARVESTING MACHINE
Filed Oct. 20, 1925
4 Sheets-Sheet 4
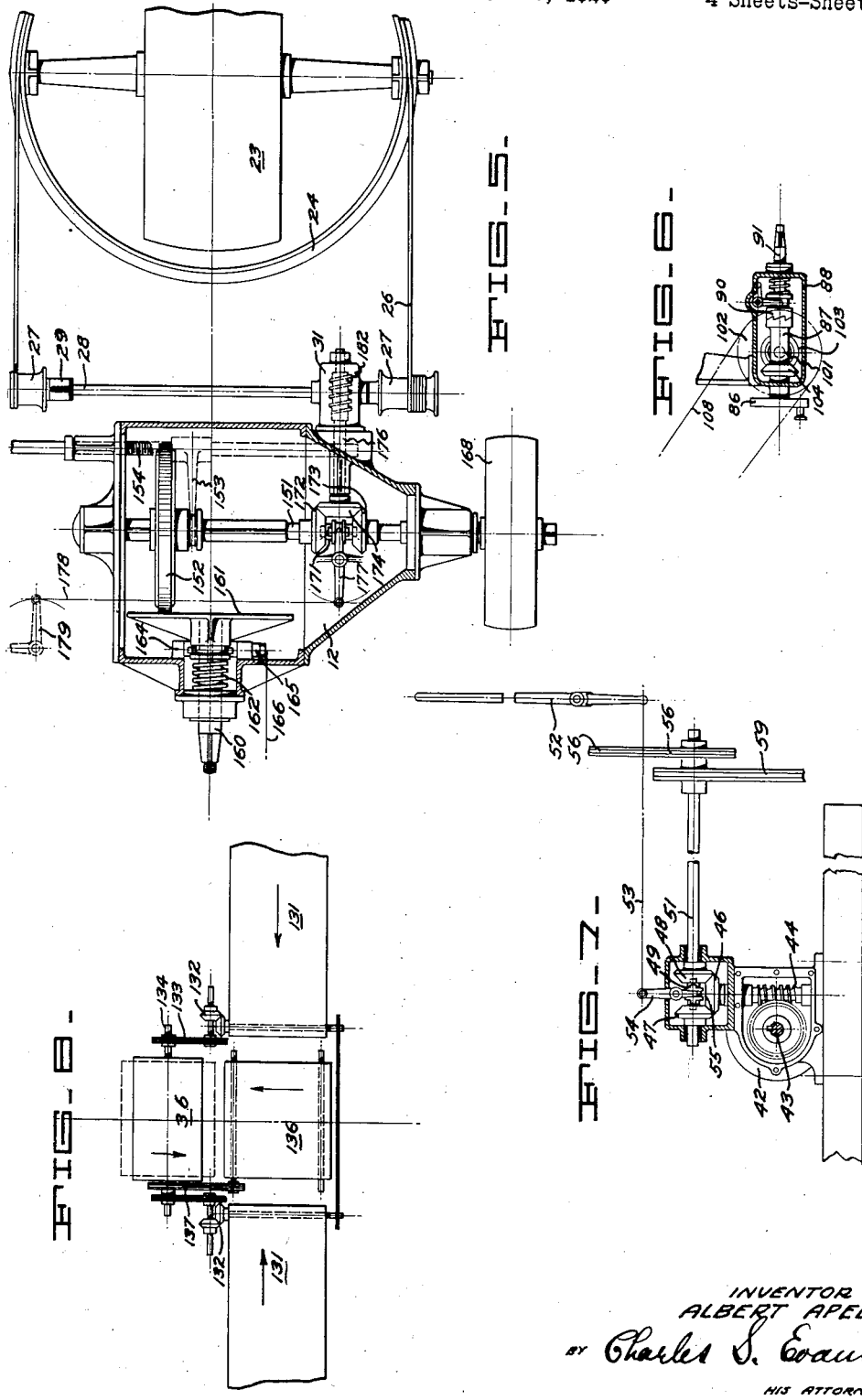
INVENTOR
ALBERT APEL
BY Charles S. Evans
HIS ATTORNEY Patented Dec. 13, 1927.

1,652,806

UNITED STATES PATENT OFFICE.

ALBERT APEL, OF STOCKTON, CALIFORNIA.

HARVESTING MACHINE.

Application filed October 20, 1925. Serial No. 63,588.

My invention relates to machines for harvesting grain and one of the objects of the invention is the provision of a harvesting machine in which the header mechanism is mounted on the main vehicular frame across the front thereof, and in such a manner that the sickle bar maintains parallelism with the ground irrespective of the slope on which the harvester is working.

Another object of the invention is the provision of a harvesting machine in which means are provided for conveying the cut grain immediately away from the vicinity of the sickle bar, and straight back toward the separator machinery so that dribbling of the grain from the sickle bar, and loss thereof is avoided and clogging prevented.

Another object of the invention is the provision of a harvester in which means are provided for cutting the grain ahead of the harvester so that the harvesting machine travels entirely in a swath of its own, and so that the effective width of the harvester is reduced to substantially the length of the sickle bar.

Another object of the invention is the provision of means for so relating the speed of operation of the cutting means to the speed of ground travel of the machine, that a proper cutting speed is maintained at all times, irrespective of the ground speed of the machine.

Another object of the invention is the provision of means for mounting the separator mechanism, so that it may be maintained in substantially a horizontal position without regard to the slope of the ground across which the harvester is moving. Another object of the invention is the provision of improved controlling means for the various portions of the harvester.

Another object of the invention is the provision of pivotally mounted conveyors for transferring the cut grain from the header conveyor toward the cylinder.

Other objects of the invention together with the foregoing will be set forth in the following description of my preferred embodiment of means for practicing the invention, and which is illustrated in the drawings accompanying and forming part of the specification. It is to be understood that I do not limit myself to the showing made by the said description and drawings, as I may adopt variations of my preferred form within the scope of my invention as set forth in the claims.

Referring to the drawings:

Figure 5 is a detail in plan, showing the friction plate transmission and power-driven steering means.

Figure 6 is a detail in elevation showing the mechanism for driving the sickle.

Figure 7 is a detail in elevation showing the worm drive for the body tipping drum.

Figure 8 is a detail in plan showing the conveyors for feeding the cut grain to the cylinder.

Figure 1:
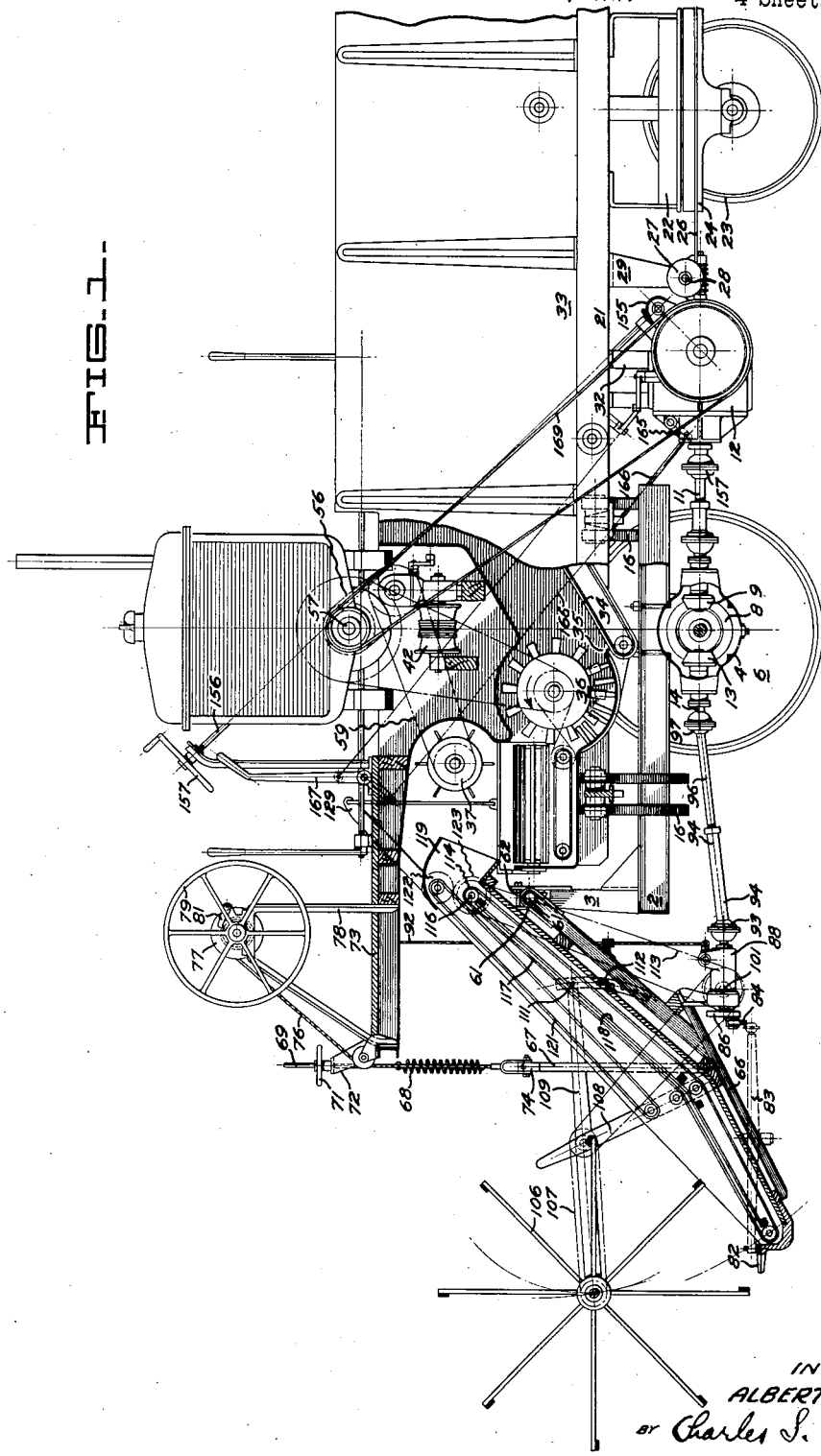
Figure 1 is a side elevation of my harvesting machine, portions of the front end of the machine being shown in vertical section, the better to disclose the construction. The rear portion of the body of the machine is omitted to shorten the figure.
Figure 2:
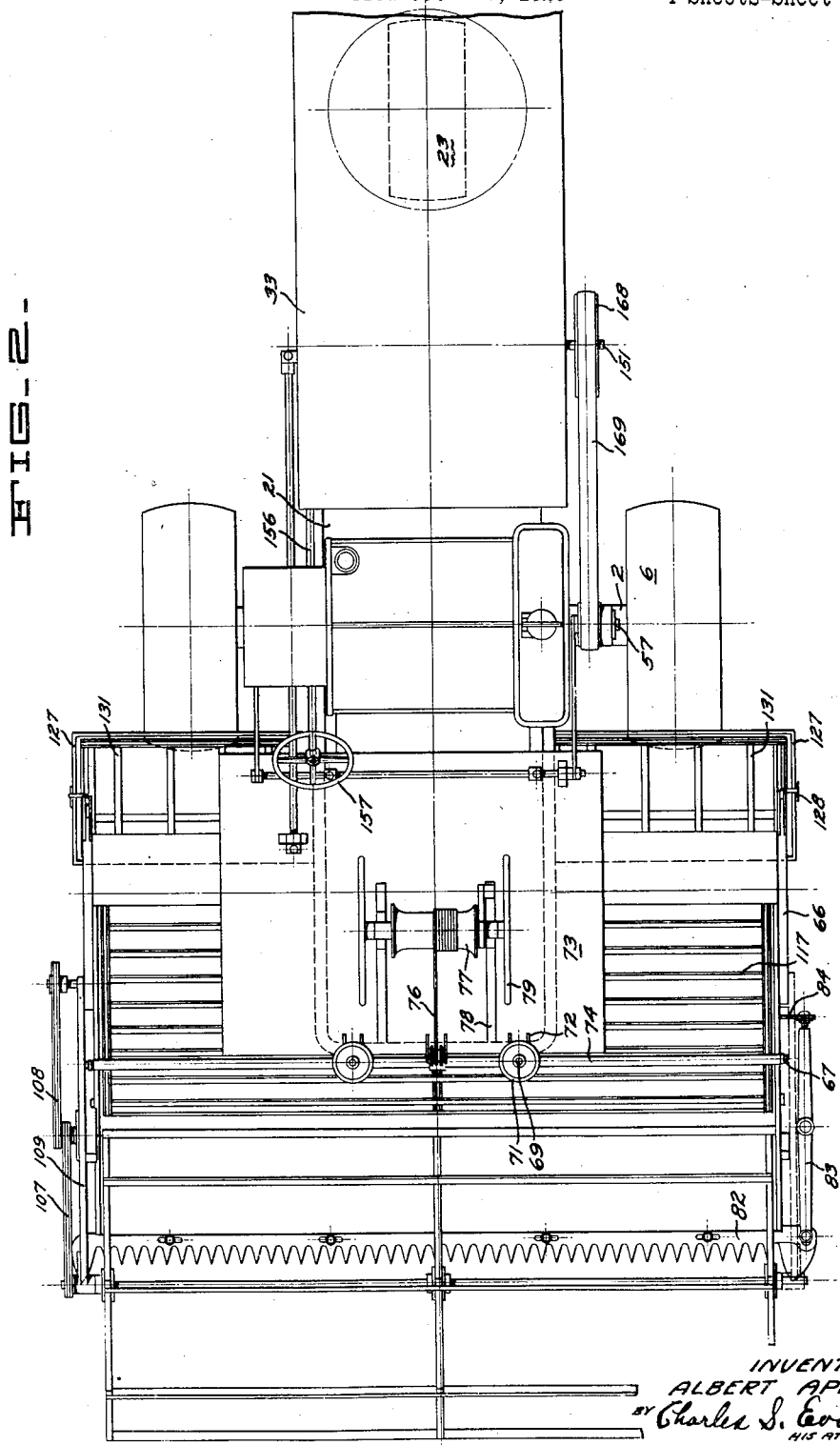
Figure 2 is a plan view of the harvesting machine, the length of the figure being similarly shortened by the omission of the rear end.
Figure 3:
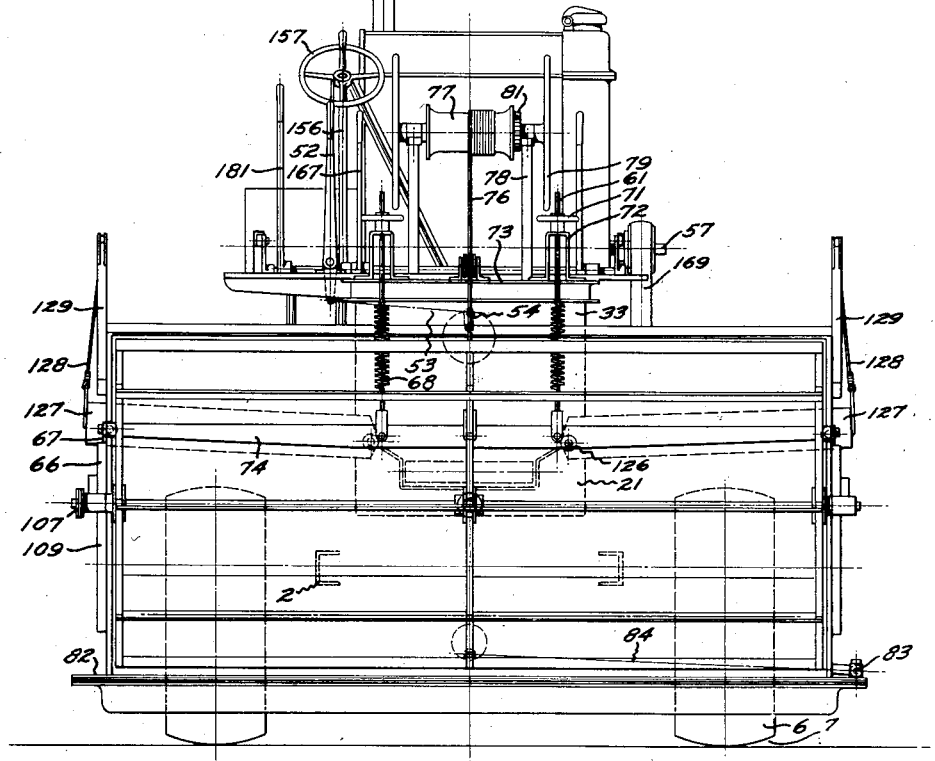
Figure 3 is a front elevation of the machine.

In terms of broad inclusion, the harvesting machine of my invention comprises a main vehicular frame mounted upon suitable ground engaging wheels. Preferably most of the weight of the apparatus is carried on two main driving wheels; and a single additional wheel supports the rear end of the machine, and serves also as the steering wheel. The motive power for the harvester as a vehicle, and for the machinery included in the harvester is supplied from a prime mover such as an internal combustion motor; and suitable means are provided for obtaining variations in the ground speed of the vehicle, and for permitting the application of power to the steering wheel, to steer the vehicle. The header mechanism of my harvesting machine extends across the entire front of the machine, so that a swath is cut thru the grain sufficiently wide to permit the entire apparatus to pass without destruction of the standing grain on each side. Means are provided for mounting the header mechanism upon the main vehicular frame so that the sickle bar maintains substantial parallelism with the ground, irrespective of the inclination of the vehicle as a whole. Pivotally mounted on the main vehicular frame is a body or second frame carrying the separator machinery and the various controls; and means are provided controllably driven by the motor for inclining this body or second frame relative to the main frame so that substantially a horizontal position may be maintained by the second frame, when the harvesting machine is traversing the side of a hill. Means independent of the separator driving means are provided for controlling the speed of travel of the harvesting machine, and means are also provided for driving the header mechanism and sickle at a speed bearing a constant relation to the speed of rotation of the driving wheels of the harvesting machine, so that the speed with which the cutting mechanism operates is the proper one at all times, irrespective of variation in the speed of travel of the harvesting machine.

In detail my harvesting machine comprises a main vehicular frame 2 provided with the posts 3 extending upwardly from each forward corner. The frame 2 is suitably supported upon the main axle housing 4, upon each end of which are arranged the main drive wheels 6. Preferably the wheels are provided with the curved tread 7, as shown in Figure 4.

Arranged within the axle housing is the usual differential drive mechanism including the ring gear 8, and the driving pinion 9, from which the driving shaft 11 extends backwardly thru the transmission housing 12. The axle housing also carries a pinion 13 on the end of the shaft 14 which forms part of the driving mechanism of the header.

Figure 4:
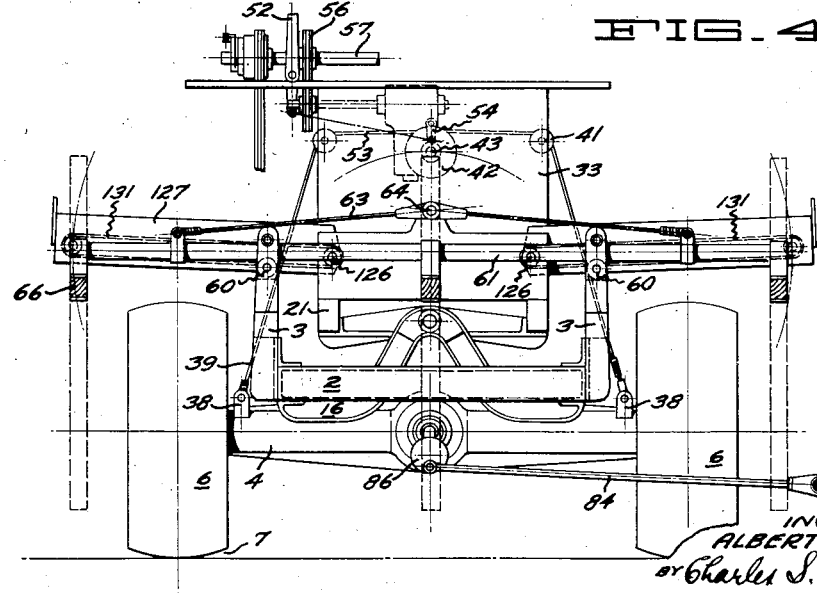
Figure 4 is a front elevation of a portion of the machine, as seen with the header removed.

Secured to the main frame 2 are brackets 16, as best shown in Figure 4; and pivotally mounted on these brackets on an axis extending longitudinally of the harvesting machine is a second or body frame 21, the rear end of which carries the bracket 22, in which the steering wheel 23 is journaled. The steering wheel also is preferably provided with a curved tread, and is carried according to well known practice in the caster ring 24, from which suitable cables 26, extend forwardly to the drums 27, fixed on the ends of the shaft 28. One end of the shaft is journaled in the bracket 29 mounted on the body frame 21, and the other end of the shaft is carried in an extension 31, arranged on the transmission housing 12, which is also supported on the body frame 21 by suitable brackets 32.

Arranged upon the body frame 21, is a body 33, within which is disposed the usual separator machinery, which forms no part of my present invention, and which is therefore neither shown nor described herein, beyond mere mention of the grain carrier 34, the concave 35, the cylinder 36, and the beater 37.

Means are provided for moving the body of the harvesting machine about its pivotal axis so that the body may be maintained in substantially a horizontal position, even tho the machine is traversing a hillside. Secured to suitable eyes 38, fixed at the ends of the main axle housing, are the ends of a cable 39, which passes upwardly over pulleys 41 arranged on the body 33, and around the control drum 42. The control drum is slightly coned in each direction from the center toward the edge to compensate for the variation in distance between the drum axis and the eyes 38. The drum is fixed on a shaft 43, which also carries a worm wheel driven by the worm 44, on the end of which is the pinion 46, in mesh with the two clutch gears 47 and 48, loosely arranged on the shaft 51. A clutch sleeve 49 splined to the shaft is movable to engage either of the gears 47 and 48 by the manually controlled lever 52, connected by the link 53 with the lever 54, which embodies a yoke engaging the annular groove 55, formed in the clutch sleeve 49. The shaft 51 is suitably connected, as by the chain 56 with the shaft 57 of the motor 58, and a chain 59 serves to drive the beater 37 from the shaft 51. Movement therefore of the hand lever 52, will engage the clutch with either of the gears 47 and 48 and effect the tipping of the body 33, in accordance with the desires of the operator. Because of the irreversible character of the worm drive, the tipped body stays in the position to which it is adjusted.

Means are provided for mounting the header mechanism on the front end of the main vehicular frame, so that it may be readily detached when desired. Arranged in the posts 3 are rollers 60 on which the cylindrical pipe 61 is supported. The pipe is removably retained on each roller by a pin or bolt 62, disposed in the post above the pipe. A cable 63 fixed to the pipe adjacent each end is connected to a pin 64 fixed on the body frame of the machine, so that when the harvester is on a side hill and the body is leveled, such movement pulls the pipe 62 a short distance upwardly. This is the purpose of properly positioning the header mechanism which is carried on the pipe. Fixed to the pipe 61 is a header frame 66, also supported by the links 67, pivotally connected at their lower ends to the frame 66, and at their other ends to the counterbalancing springs 68. The upper end of each spring is connected to a threaded shaft 69, which may be adjusted vertically by the hand wheels 71 thru which each shaft passes. The hand wheels 71 are removably supported on the brackets 72, arranged on the forward end of the operating platform 73.

Means are provided for raising and lowering the header frame. Fastened to the cross bar 74, connecting the links 67, is a cable 76, wound about the drum 77. The drum is carried on a suitable stand 78, erected from the operating platform 73, and is controlled by the hand wheel 79, and the ratchet 81.

Arranged on the front of the header frame 66 is the sickle bar and sickle 82, connected at one end to the lever 83, pivoted adjacent its center on the header frame, and driven at its rear end by the pitman 84, connected to the crank disk 86. As shown in Figure 6, the crank disk is carried on the shaft 87, arranged in the housing 88, which is also mounted on the header frame. The shaft 87 is releasably connected by the spring-pressed clutch 90, with the drive shaft 91, the clutch being operated from the control platform by the cord 92. The shaft 91 is connected thru the universal joint 93, with the square sleeve 94, adapted to receive therein with a sliding fit, the square shaft 96, which is connected by the universal joint 97, with the shaft 14, which as previously explained is driven from the differential mechanism of the main drive. The sliding non-rotary connection between the sleeve 94 and the shaft 96, not only permits vertical adjustment of the header without disturbing the drive of the header mechanism, but it also permits the header to be detached. Journaled also in the housing 88 is a shaft 101, carrying the sprocket 102 on the outside of the housing and on the inside the gear 103 in mesh with the gear 104, on the shaft 87.

The header reel 106 is driven from the sprocket 102 by the chains 107 and 108, travelling over suitably disposed sprockets, arranged on the arm 109. This arm is pivotally arranged on the header frame and is adjustable thereon, by means of variation in the setting of the pins 111 in the apertured segments 112, one of which is arranged on each side of the header frame. Arranged on the same shaft with the sprocket 102, is another sprocket, connected by the chain 113, with the sprocket 114, fixed at the upper end of the header frame, on the shaft 116, over which the upper end of the slot conveyor 117 passes.

This conveyor which is of the slot type moves over the continuous back board or platen 118, extending down to closely adjacent to the sickle bar; and its function is to carry the cut grain straight backwardly and upwardly without loss or waste into the discharge chute 118. It is assisted in this function by the conveyor 121, also mounted on the header frame, and driven by the gear 122, meshed with the gear 123 on the shaft 116. The cut grain therefore moves in a direction opposite to the movement of the harvester as a whole.

Since the cut grain is discharged from the chute 116 over a rather extensive area which is substantially the width of the header, means are provided for moving the grain towards the center of the machine, and then backwardly into the cylinder. Pivoted on the pins 126, fixed in the body frame 21, on each side of the longitudinal axis of the machine, are frames 127, the outer ends of which are supported by the cables 128, attached to the arms 129, one of which is on each side of the header frame. Disposed in each frame 127 is a conveyor 131, driven by the gears 132, and chains 133, from the shaft 134 of the cylinder 36. The direction of movement of the conveyors 131, is toward the center of the machine and the cut grain deposited on the conveyors, is carried towards the center of the machine, and falls upon the transverse conveyor 136, which is also driven from the cylinder shaft 134, by the belt 137. The direction of movement of this transverse conveyor is towards the cylinder, so that by the cooperation of the conveyors 131 and 136, the cut grain is delivered to the cylinder.

When the machine is operating upon a hillside, and the body 33 is leveled, the position of the outer ends of the frames 127, carrying the conveyors 131, is altered with respect to the body 33, but not altered with respect to the header mechanism, from the frame of which the conveyors are suspended. This insures proper operation of the conveyors 131, irrespective of the angular adjustment of the body 33 on the main frame.

Means are provided for varying the ground speed of the harvester. Arranged in the housing 12 is a splined shaft 151, upon which the friction wheel 152, may be moved by the arms 153, carried on the threaded shaft 154. This shaft is connected by gears 155, with the shaft 156 terminating in a hand wheel 157, adjacent to the control platform. Also journaled in the housing 12 and connected by the universal joint 159 to the drive shaft 11, is a shaft 160, on which is splined a disk 161, normally pressed against the friction wheel 152 by the spring 162. Engaging in an annular groove in the hub of the friction disk 161 is a yoke 164 controlled by the lever arm 165. The lever is connected by the link 166 with a manually operated lever 167, arranged on the control platform. The shaft 151 is rotated by the pulley 168, connected by the belt 169, with a pulley on the motor shaft 57.

Movement of the control lever retracts the friction disk from engagement with the friction wheel 152, and permits the latter to be moved across the face of the disk by operation of the hand wheel 157, so as to change the ground speed of the harvester in accordance with operating conditions.

Also slidably mounted on the splined shaft 151 is the clutch sleeve 171 adapted to engage either of the gears 172 and 173 loosely mounted thereon. A pinion 174 on the shaft 176 is in mesh with both the gears 172 or 173. Movement of the clutch sleeve 171, is accomplished by the lever 177, connected by the link 178, and bell crank lever 179, with a suitable steering lever 181, adjacent to the control platform. The other end of the shaft 176 is provided with a worm 182, meshing with a worm wheel on the shaft 28, carrying the steering drums 27. Thus movement of the steering lever 181 is effective to engage the clutch sleeve with either of the gears 172 and 173 and thus rotate the shaft 28, so that the cables 26 are wound up on one side and unwound on the other, to effect the steering of the harvester.

I claim:

1. A harvesting machine comprising a main vehicular frame, seats arranged at the front of said frame, a shaft rotatably and slidably disposed in said seats, a header mechanism arranged at its rear end on said shaft, and means for adjustably supporting the front end of said header mechanism.

2. A harvesting machine comprising a main vehicular frame, seats arranged at the front of said frame, a shaft rotatably and slidably disposed in said seats, a header mechanism arranged at its rear end on said shaft, means for counterbalancing the weight of said header mechanism and means for adjusting the position of said header mechanism on said main frame.

3. A harvesting machine comprising a main vehicular frame, a cylinder forming part of the separator mechanism arranged on said frame, a longitudinal conveyor in front of and moving toward said cylinder, a transverse conveyor on each side of and moving toward the longitudinal conveyor, a header frame mounted on the front of said main frame, cutting means arranged on the front of said header frame, and a conveyor on said header frame discharging upon said longitudinal and transverse conveyors.

4. A harvesting machine comprising a main vehicular frame, a body frame pivotally mounted on said vehicular frame, a cylinder forming part of the separator mechanism arranged on said body frame, a longitudinal conveyor in front of and moving toward said cylinder, a transverse conveyor on each side of and moving toward the longitudinal conveyor, each of said transverse conveyors being mounted for bodily pivotal movement about an axis adjacent said longitudinal conveyor, a header mechanism including a frame arranged on said vehicular frame, and means for supporting the free ends of said transverse conveyors from said header frame.

5. A harvesting machine comprising a main vehicular frame, wheels on which said frame is supported in substantial parallelism with the ground, a body frame mounted on said main frame for pivotal movement about a longitudinal axis of the main frame, and means for moving said body frame about said axis.

6. A harvesting machine comprising a main vehicular frame, wheels on which said frame is supported in substantial parallelism with the ground, a body frame mounted on said main frame for pivotal movement about a longitudinal axis of the main frame, a drum fixed on one of said frames, a cable passing around said drum and having its ends secured to the other frame, and means for optionally rotating said drum in either direction.

7. A harvesting machine comprising a main vehicular frame, wheels on which said frame is supported in substantial parallelism with the ground, a body frame mounted on said main frame for pivotal movement about a longitudinal axis of the main frame, a drum fixed on one of said frames, a cable passing around said drum and having its ends secured to the other frame, a prime mover, irreversible driving mechanism for said drum, and a reversible clutch interposed between the prime mover and the irreversible mechanism.

8. A grain harvesting machine comprising a main vehicular frame, a header frame extending across the front of the main frame, grain cutting means on the forward edge of the header frame, an endless chain on each side of the header frame, a plurality of parallel slats connecting said chains, and a continuous platen arranged between the chains over which the slats pass, and means for driving the chains.

9. A harvesting machine comprising a main vehicular frame, wheels for supporting the frame, a header pivotally arranged on said main frame on an axis at right angles to the longitudinal axis of said main frame, a body frame pivotally arranged on said main frame on an axis parallel to the longitudinal axis of said main frame, a cylinder forming part of the separator machinery arranged on said body frame, a prime mover arranged on said body frame, means controllably actuated by said prime mover for moving the body frame on its axis, means controllably actuated by said prime mover for driving the supporting wheels, means for driving the header from the wheel driving means, and means controllably actuated by said prime mover for actuating the cylinder.

In testimony whereof, I have hereunto set my hand.

ALBERT APEL.